Feb. 11, 1958     T. C. HUXLEY III, ET AL     2,822,803
ARTIFICIAL RESPIRATION APPARATUS

Filed May 18, 1954     6 Sheets-Sheet 1

INVENTORS
Thomas C. Huxley III
Nelson G. Kling
BY
ATTORNEYS

Feb. 11, 1958 T. C. HUXLEY III, ET AL 2,822,803
ARTIFICIAL RESPIRATION APPARATUS
Filed May 18, 1954 6 Sheets-Sheet 2
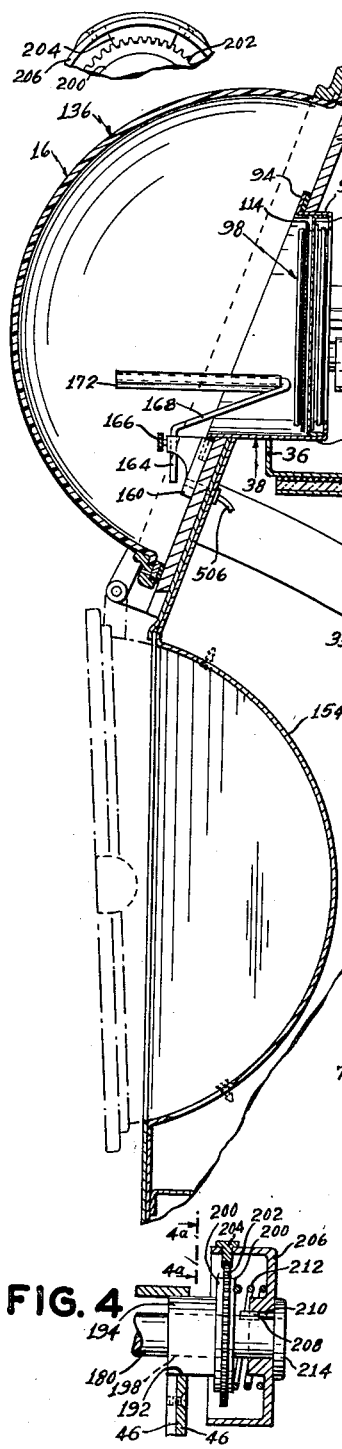
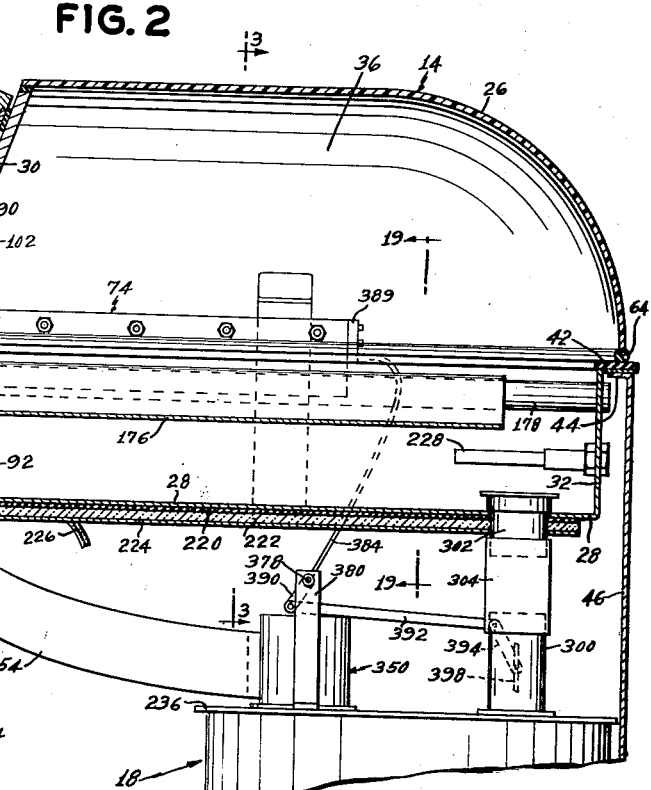
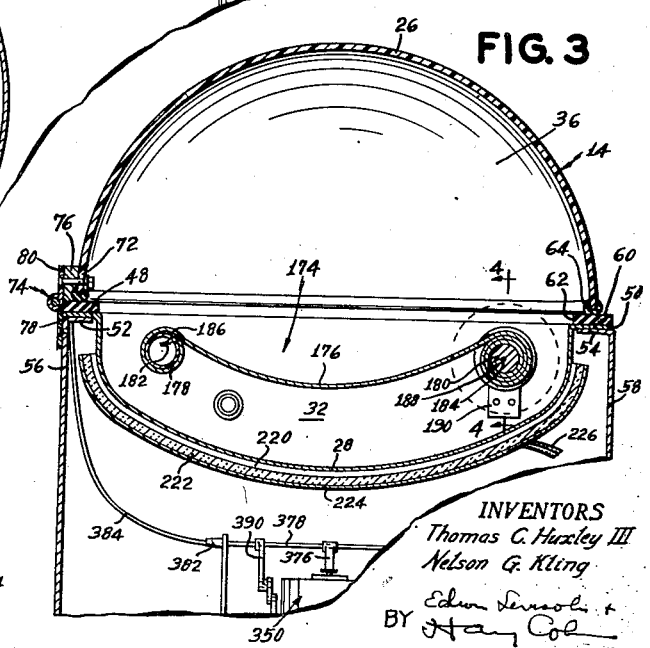
INVENTORS
Thomas C. Huxley III
Nelson G. Kling
ATTORNEYS

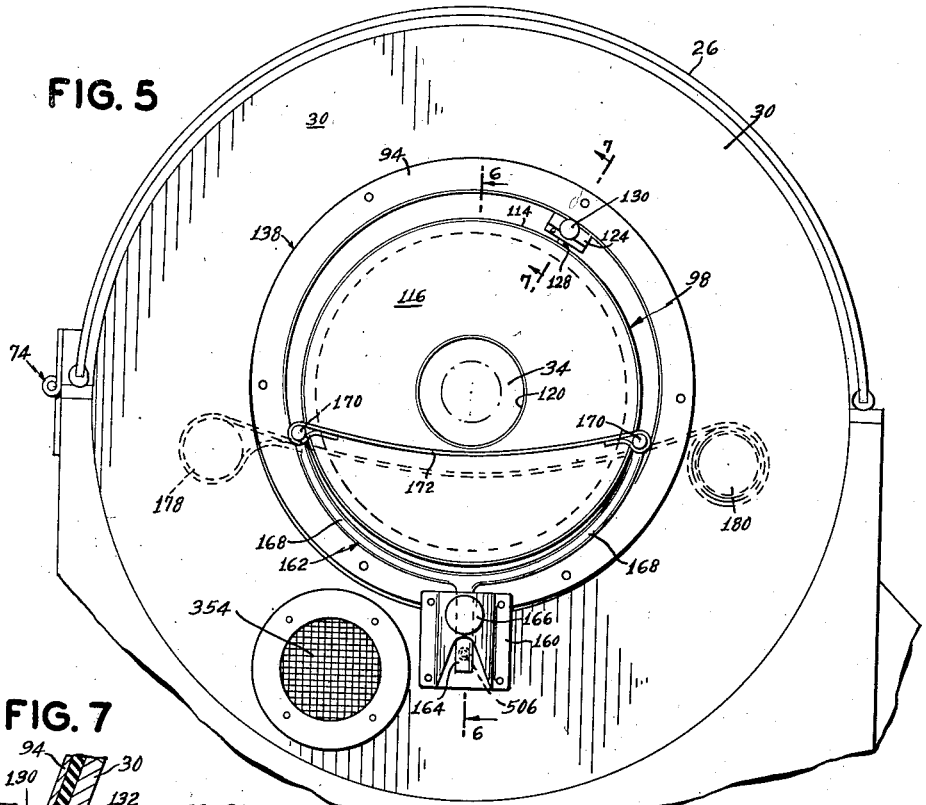
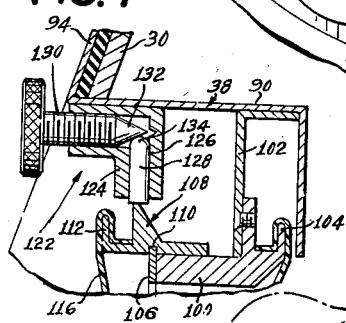
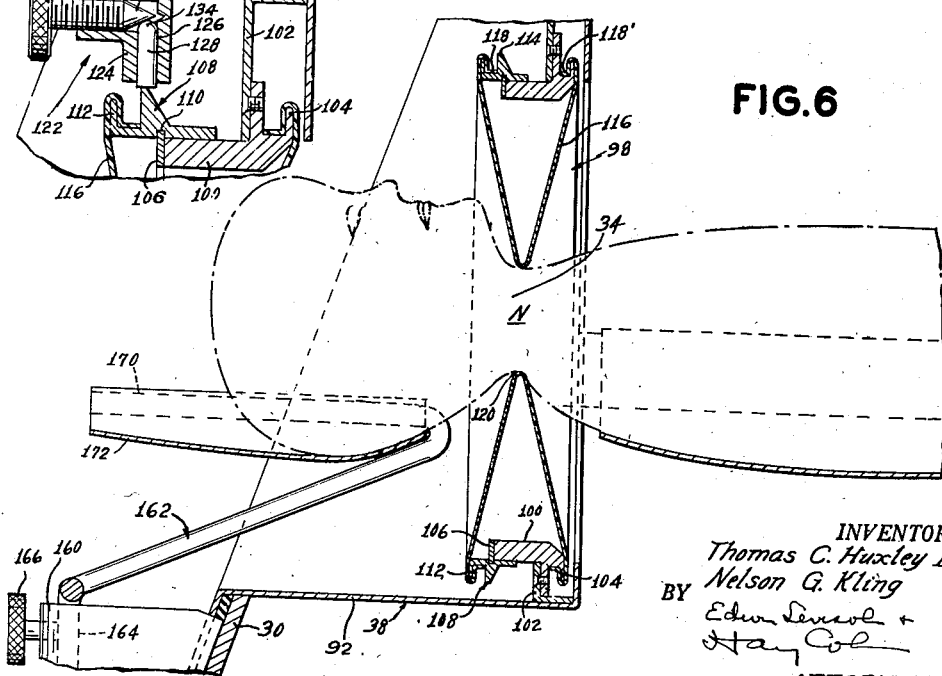

Feb. 11, 1958 T. C. HUXLEY III, ET AL 2,822,803
ARTIFICIAL RESPIRATION APPARATUS
Filed May 18, 1954 6 Sheets-Sheet 4

INVENTORS
Thomas C. Huxley III
Nelson G. Kling
BY

ATTORNEYS

Feb. 11, 1958 T. C. HUXLEY III, ET AL 2,822,803
ARTIFICIAL RESPIRATION APPARATUS
Filed May 18, 1954 6 Sheets-Sheet 5
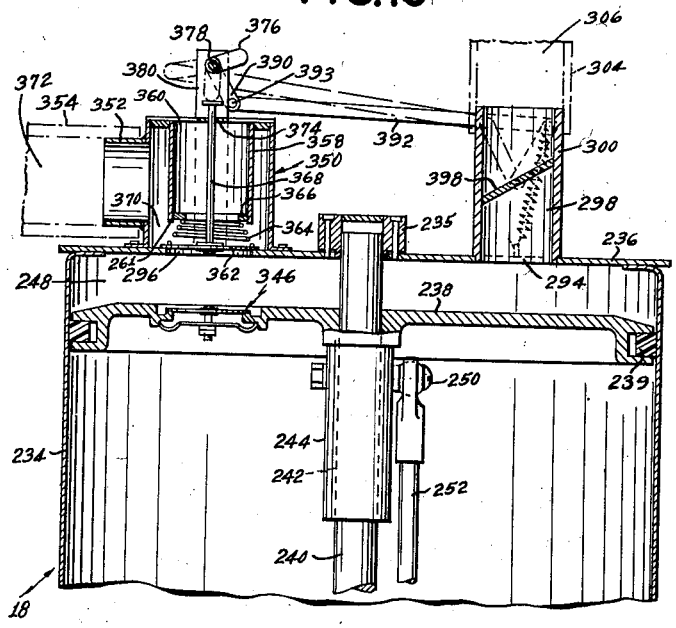
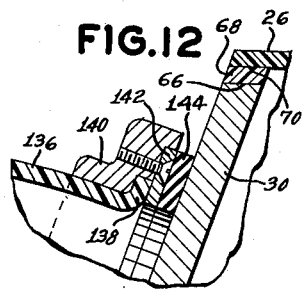
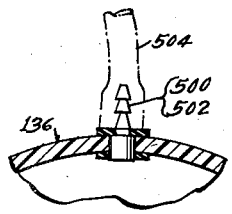
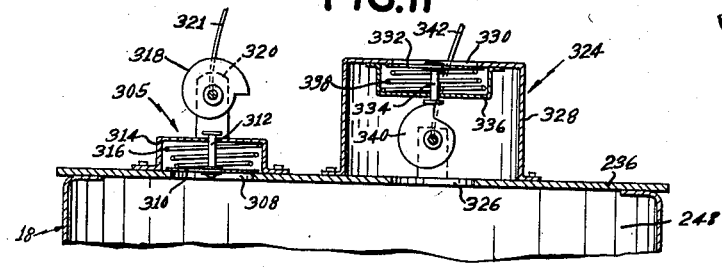
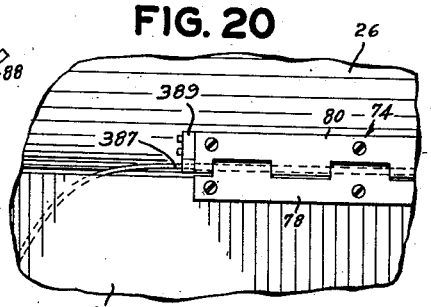
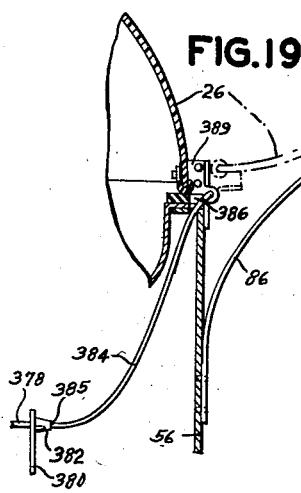
INVENTORS
Thomas C. Huxley III
Nelson G. Kling
BY
ATTORNEYS Feb. 11, 1958  T. C. HUXLEY III, ET AL  2,822,803
ARTIFICIAL RESPIRATION APPARATUS
Filed May 18, 1954  6 Sheets-Sheet 6

INVENTORS
Thomas C. Huxley III
Nelson G. Kling
BY
ATTORNEYS

United States Patent Office 2,822,803
Patented Feb. 11, 1958

2,822,803
ARTIFICIAL RESPIRATION APPARATUS

Thomas C. Huxley III, Manhasset, and Nelson G. Kling, Roslyn, N. Y., assignors to Conitech, Ltd., New York, N. Y., a corporation of New York Application May 18, 1954, Serial No. 430,616

13 Claims. (Cl. 128—30)

This invention relates generally to improvements in artificial respiration apparatus and, more particularly, to improvements in artificial respiration apparatus of the type especially adapted for the treatment of infants.

One object of the present invention is the provision of a compact, readily-portable, and reliable artificial respirator having a body chamber and a separate head chamber which is eminently suitable for the treatment of infants.

Another object of the present invention is the provision of artificial respiration apparatus having a body chamber and a separate head chamber in which the opening of the body chamber to gain access therein for the treatment of a patient is effective to automatically supply air to the head chamber so that the opening of the body chamber will not interrupt the application of artificial respiration.

Another object of the present invention is the provision, in artificial respiration apparatus of the above character, of an improved arrangement for applying a controlled degree of heat to the body chamber, as when incubation is needed.

Another object of the present invention is the provision, in artificial respiration apparatus of the above character, of an improved arrangement for supporting the head and body of the patient in the head and body chambers, respectively, in which the patient's head or body may be raised or lowered as desired by simple and conveniently operable mechanism.

Another object of the present invention is the provision, in artificial respiration apparatus of the above character, of an improved arrangement for removably supporting an atomizer bottle or other fluid container in relation to the head chamber in fluid communication therewith.

Yet another object of the present invention is the provision of generally improved respiration apparatus of the above character which is simple in design and construction, relatively inexpensive to manufacture, and highly effective in the accomplishment of its intended purposes.

The above and other objects, features and advantages of the present invention will be more fully understood from the following description considered in connection with the accompanying illustrative drawings.

In the drawings which illustrate the best mode now contemplated by us for carrying out our invention:

Fig. 2 is a sectional view taken on the line 2—2 of Fig. 1;

Fig. 3 is a sectional view taken on the line 3—3 of Fig. 2;

Fig. 4 is a sectional view taken on the line 4—4 of Fig. 3;

Fig. 4a is a fragmentary view taken on the line 4a—4a of Fig. 4;

Fig. 5 is an end view, on an enlarged scale, of the head chamber with the head chamber cover shown in the open position;

Fig. 6 is a sectional view taken on the line 6—6 of Fig. 5 with a patient shown supported in the apparatus;

Fig. 7 is a sectional view taken on the line 7—7 of Fig. 5;

Fig. 10 is a sectional view taken on the line 10—10 of Fig. 8;

Fig. 11 is a sectional view taken on the line 11—11 of Fig. 8;

Fig. 12 is a sectional view, on an enlarged scale, taken on the line 12—12 of Fig. 1;

Fig. 18 is a sectional view taken on the line 18—18 of Fig. 1, on an enlarged scale, with a fragmentary portion of a tube shown connected to a head chamber fitting in broken lines;

Fig. 19 is a sectional view taken on the line 19—19 of Fig. 2; and

Fig. 20 is a fragmentary rear view showing the hinged connection of the body chamber cover to the apparatus.

Figure 1:
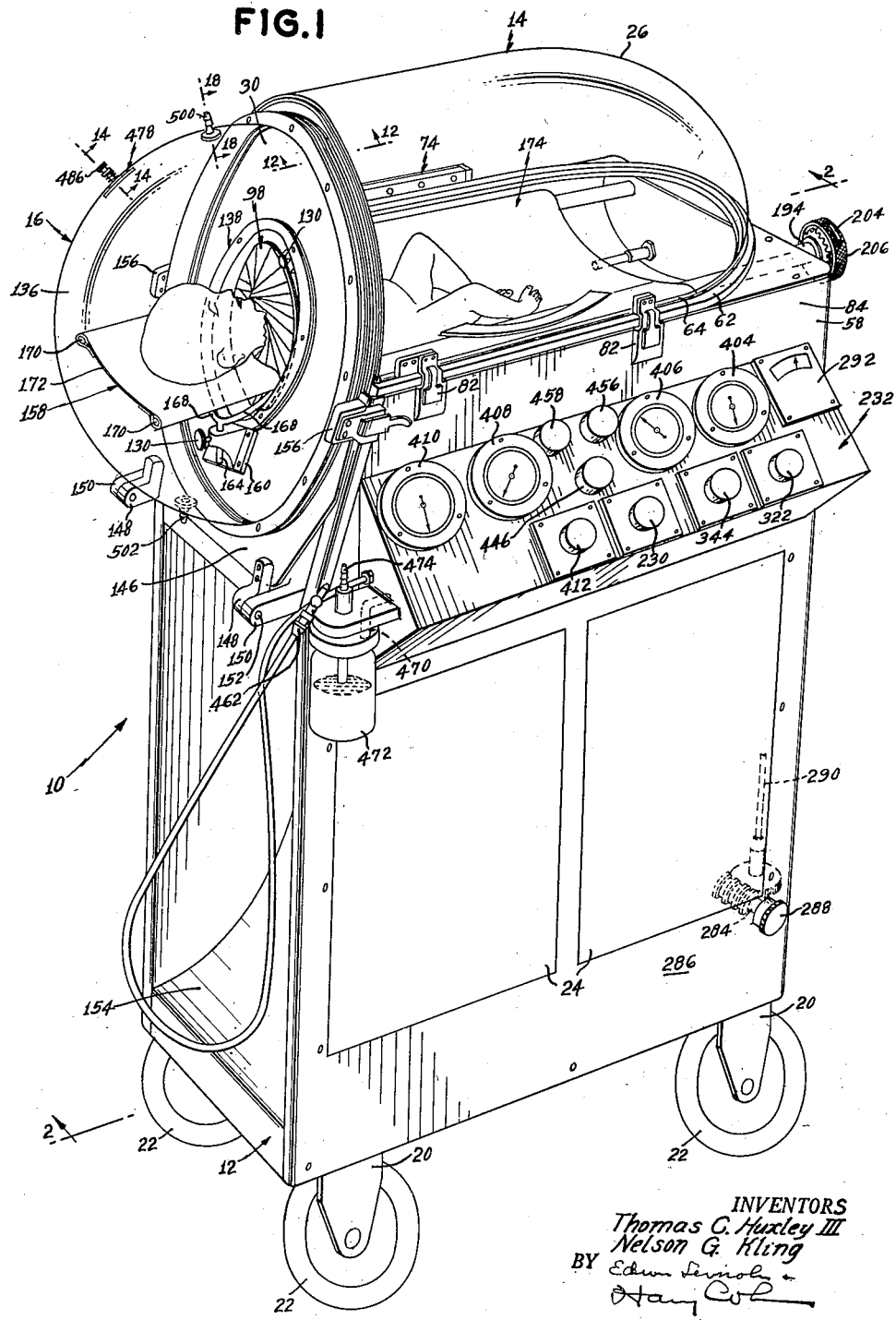
Fig. 1 is a front perspective view of the artificial respiration apparatus formed according to the present invention.

Referring to the drawings and, more particularly, to Figs. 1 through 3 thereof, the artificial respiration apparatus 10 comprises a base part 12 having a body chamber 14 and a separate head chamber 16 mounted thereon, there being provided an air pump 18 in said base part which is adapted to periodically supply air to and withdraw air from said body chamber and to periodically supply air to said head chamber in the manner to be described in detail hereinafter. The base part 12, at the bottom thereof, is provided with a plurality of depending supports 20 on which there is mounted suitable wheels 22 to provide for the ready portability or movability of the instant apparatus. The base part 12, which constitutes a housing for the pumping apparatus 18 and the other devices to be hereinafter more fully described, may be of any suitable design and construction and in the instant embodiment said part is provided with a series of openable panels 24 whereby to provide ready access to the interior of said base part.

Positioned at the upper part of the base part 12 is a body chamber 14 having an openable top cover 26, said body chamber comprising a longitudinally extending base wall 28 of arcuate configuration and fixed opposite end walls 30 and 32, there being provided an opening 34 in wall 30 so that the patient's head may be positioned in the head chamber 16 through said opening. It will be understood that the body chamber 14 is normally adapted for the reception of the patient's body and when the cover 26 is closed as shown in Figs. 1 through 3, the interior 36 of said chamber is adapted for operative association with the pumping apparatus 18 with the latter being adapted to rhythmically vary the air pressure in said interior of the body chamber. The bottom arcuate wall 28 of chamber 14 is provided with an upstanding end part 36 which is secured in any suitable manner to the peripheral wall 38 in fluid sealing relation therewith, the opposite end of said bottom wall being suitably bent to form the end wall 32. The upper laterally projecting flange 42 of the wall 32 is suitably integrated with the inwardly projecting flange 44 of the wall 46, the latter wall constituting an end wall of the base part 12. The side marginal edge portions 48 and 50 of the bottom wall 28 are secured to the flanges 52 and 54, respectively, of the walls 56 and 58, respectively, the latter walls constituting the rear and front walls, respectively, of the base 12 of the instant apparatus (Fig. 3). The peripherally extending marginal portion 60 of the lower part of chamber 14 is provided with a peripherally extending sealing strip 62 of any suitable material whereby to provide a sealed interior 36 for said chamber when the cover 26 is latched closed. It will be apparent that the lower peripherally extending edge 64 of the cover 26 is adapted for sealing engagement with the sealing strip 62 when said cover is in its latched closed position. The peripherally extending edge 64 is preferably defined by a sealing strip formed of a suitable resilient material in order to effect a fluid-tight seal between the cover 26 and the lower part of the chamber 14. The cover 26 may be of any suitable design and construction and in the illustrated embodiment said cover is formed of a transparent plastic material so that interior 36 of the chamber 14 will be readily visible at all times by the attendant. The cover 16 is cross-sectionally of arcuate configuration and the forward end part 64 of said cover is downwardly curved longitudinally of said cover. With reference to Fig. 12, it is to be noted that the marginal edge 66 of the wall 30 has a suitable sealing strip 68 secured thereto, said sealing strip being adapted to cooperate with the end peripheral marginal edge portion 70 of the cover 26 to provide a sealing engagement between the cover 26 and the wall 30 when said cover is latched closed in the manner to be described in detail hereinafter. From the above it will therefore be apparent that when the cover 26 is in the lateral closed position, said cover will seal with the bottom part of chamber 14 to provide a sealed interior 36 for the chamber.

The rear side marginal edge portion 72 of the cover 26 is hingedly secured to the wall 56 by means of the hinge 74 (Figs. 3, 19 and 20), there being provided a spacer strip 76 between said hinge and said marginal edge portion. The lower plate 78 of the hinge 74 is secured to the wall 56 in any suitable manner and the upper plate 80 of said hinge is similarly suitably secured to the marginal portion 72 in any suitable manner, the spacer strip 76 being interposed between said marginal portion and said upper plate. A pair of spaced releasable latches 82 are provided for releasably latching the free side 84 of the cover 26 in the closed position, it being understood that said releasable latches may be of any suitable design and construction and on the release thereof the cover 26 is adapted to be pivoted on the hinge 74 to the open cover position as shown in broken lines in Fig. 19. Secured to the rear wall 56 is a generally upstanding support member 86 of spring material having a pad 88 secured to the free end thereof in any suitable manner, said support member being adapted to support the cover 26 in its fully opened position as clearly illustrated in Fig. 19. Thus on the opening of the cover 26 surface portions thereof will abut the pad 88 formed of a soft material and the member 86 will support said cover.

With reference to Figs. 2 and 6, it is to be noted that the inclined wall 30 constitutes a partition between the chambers 14 and 16 and said wall or partition is provided with an opening 34 through which the patient's head is adapted to extend for the positioning thereof in the head chamber 16, there being provided an adjustable closure device 98 which defines said opening and which provides for the sealing of the latter at the patient's neck N as will be described hereinafter. The annular wall 38, which is inset in the wall 30, is of a configuration to provide for a substantially vertical opening 34, it being apparent that said peripheral wall is provided with a relatively narrow upper part 90 and a substantially wider lower part 92, with said peripheral wall tapering in width between the upper part thereof and said lower part. The peripheral wall 38, which is inset in the wall 30 to provide for a substantially upright opening 34, is provided with a peripherally extending flange 94 which is secured to adjacent marginal portions of the wall 30 in fluid sealing relation therewith.

With reference to Figs. 2, 6 and 7, the adjustable closure device 98, which defines the opening 34, comprises a fixed ring 100 which is secured to the peripheral wall 38, in fluid sealing relation therewith, through the interposition of the annular mounting bracket 102, said ring having an annular mounting flange 104 at its forward end and an annular guide part 106 at its rear end with said guide part being adapted to rotatably mount the ring 108. The rotatable ring 108 is provided with an internal annular groove 110 which is adapted for the reception of the guide part 106, said rotatable ring being further provided with an annular mounting flange 112 which is formed similar to its companion flange 104 of the fixed ring 100. Thus the fixed ring 100 carries the rotatable ring 108 and the latter is preferably provided with an annular knurled part 114 to facilitate the manual rotation of said rotatable ring for adjusting the closure device 98 in the manner now to be described. Associated with the fixed and movable rings and detachably mounted thereto is an annular flexible member 116 formed of fluid impervious material having elasticized marginal edge portions 118, one of said marginal edge portions 118' being adapted to extend over the peripheral flange 104 with the opposite marginal edge portion 118 being adapted to extend over the peripheral flange 112 of the movable ring 108. Thus the marginal edge portion 118' is fixed whereas the opposite marginal edge portion 118 associated with the movable ring 108 is rotatable and it will be apparent that the rotation of said movable ring will be effective to adjust the size of the opening 34 between the chambers 14 and 16. The closure device 98 functions in the manner of an iris diaphragm and the rotation of the ring 108 in a closing direction will be effective to form member 116 into a series of overlapping pleats to form a fluid-tight seal between the peripheral edge 120 of the patient's neck N and the opening 34 defined by said member. In practice, the ring 108 will be disposed to fully open the opening 34 to provide for the extension of the patient's head through said opening and thereafter the ring 108 will be rotated in a closing direction to effect a fluid seal between the edge 120 of the patient's neck and said opening without exerting undue pressure on the patient's neck.

In order to releasably maintain the movable ring 108 in adjusted position, there is provided a manually operable clamping device 122, best shown in Fig. 7, which will now be described. The clamping device 122 comprises a bracket 124 which is fixedly mounted to the outside of the peripheral wall 38 in any suitable manner, said bracket having a bore 126 in which is slidably mounted the locking member 128, the latter being adapted to be projected outwardly of said bore by means of the clamping screw 130. The pointed end 132 of the clamping screw 130 is cooperatively associated with the rounded inner end 134 of the member 128 wherein it will be apparent that the rotation of said clamping screw in a clamping direction will be effective to project the member 128 outwardly of the bore 126 into clamping engagement with the knurled part 114 of the movable ring 108. The clamping device 122 may be readily released to permit the manual rotation of the movable ring 108 by unscrewing the clamping screw 130 in order to release the clamping engagement between the member 128 and said movable ring. It is to be noted that the member 116 may be readily removed from the companion rings 100 and 108 by stretching the elasticized edges 118 of said member over the mounting flanges 104 and 112 of said rings.

The dome-shaped openable cover or dome 136 of the head chamber 16 is preferably formed of a suitable transparent plastic material, the projecting peripheral portion 138 of said dome being clamped between the companion mounting rings 140 and 142 (Fig. 12), the latter having a sealing ring 144 secured thereto in any suitable manner in order to provide a fluid seal for the chamber 16 when the dome 136 is in the closed position, as shown in Figs. 1 and 2. Depending from the dome 136 is a part 146 which carries a pair of spaced brackets 148, the latter being formed complementary to the brackets 150 carried by the base 12 and being pivotally mounted thereto by means of the pivot pins 152. Thus the dome or openable cover 136 is pivotally mounted to the base part through the intermediation of the complementary pivotally connected brackets 148 and 150 and said dome is pivotally movable between the closed position as shown in solid lines in Fig. 2 and the open position as shown in broken lines in said figure, it being noted that the end wall 154 of the base part 12 is suitably recessed for the reception of said dome when the latter is pivoted to the open position. Thus the dome 136, when in the closed position, seals with the wall 30 and suitably integrated with said dome are a pair of releasable latches 156 of any suitable construction, it being understood that said latches are adapted to releasably maintain the dome 136 in closed position.

With reference to Figs. 1, 2 and 6, the head rest 158, which is adapted to support the patient's head when the latter is positioned in the chamber 16, is vertically adjustable and is carried by the mounting bracket 160 which is secured to the wall 30 in any suitable manner. The head rest bracket 162 comprises a depending shaft 164 which is adapted to be received in a complementary aperture provided in the bracket 160, said shaft 164 being vertically adjustable relative to the bracket 160 and being adapted to be releasably retained in adjusted position by means of the clamping screw 166. The head rest bracket 162 has a pair of outwardly extending inclined arms 168 which terminate in a pair of laterally spaced support elements 170 which are substantially horizontally disposed, the head support member 172 being suitably integrated with the elements 170 and carried thereby whereby it will be apparent that said elements support the member 172 in relation to the opening 34. It follows from the above that the head rest 158 is vertically adjustable in relation to the opening 34 by means of the adjustability of the shaft 164 of the bracket 162 in the bracket 160 in the manner above described. Thus the head rest bracket 162, which is mounted in the interior of the chamber 16, is vertically adjustable in said chamber and mounts the head support member 172 in a substantially horizontal disposition as best shown in Fig. 2.

In order to adjustably support the patient's body in the interior 36 of the chamber 14, there is provided a body support 174 positioned in said body chamber, said body support comprising a flexible support member 176 formed of any suitable material which is supported at opposite sides thereof by the laterally spaced longitudinally extending support members 178 and 180 (Figs. 1, 3, 4 and 4a). The side marginal edge portions 182 and 184 of the member 176 are secured in the longitudinally extending slots 186 and 188 provided in the members 178 and 180, respectively. The opposite ends of the member 178 are fixedly secured to the walls 30 and 32 in any suitable manner and the member 180 is axially rotatable in the chamber 14 for winding the flexible member 176 thereon and for unwinding said flexible member therefrom for adjusting the width of said flexible member for correspondingly adjusting the vertical position of the patient supported thereon. The member 180 is rotatably mounted in the interior 36 of chamber 14 in any suitable manner, said member having a portion 198 which extends through a suitable aperture provided in the end wall 32, the latter being provided with a suitable bracket 190 for supporting said member at said end wall. Secured at the opening 192 of the end wall 46 is a bracket 194 which is apertured as indicated at 196 for the reception of the end portion 198 of the rotatable support member 180. Rigidly mounted between the flanges 200 of the bracket 194 is a gear 202 which is cooperatively associated with the segment gear 204 carried by the handle 206, the latter being keyed to the end portion 198 of the member 180 by means of the key 208. The key 208 is fixed to the portion 198 in any suitable manner and the handle 206 is slotted as indicated at 210 for the reception of said key, it being understood that the handle 206 is axially slidable on the portion 198 but is restrained against rotation relative to said portion. The compression spring 212 is disposed between the handle 206 and the bracket 194 and is adapted to bias said handle outwardly against the retainer element 214. In the normal locked position of the member 180 as shown in Fig. 4, the gears 202 and 204, which are formed complementary to each other, are in mesh and accordingly the handle 206 is locked against rotation to thereby concomitantly lock the member 180 against rotation. In order to rotate the member 180 the handle 206 is manually manipulated inwardly against the spring 212 to disengage the segment gear 204 from the fixed gear 202 to thereby permit said handle to be rotated for rotating the member 180. It will be understood that the compression spring 212 normally biases the handle 206 outwardly into the locked position in which the gears 202 and 204 are in mesh. From the above it will be apparent that the handle 206 and associated mechanism provides a ready means for rotating the member 180 and for releasably retaining said member in adjusted position, the rotation of said member being effective to wind and unwind portions of the flexible member 176 in relation to the member 180 for correspondingly raising and lowering the patient supported on said flexible member. Thus the body support 174 and the head rest 158 are independently vertically adjustable whereby said body support and head rest may be positioned in any desired relation within the range of adjustment thereof. Accordingly the body support 174 may be readily raised and lowered as desired by the manipulation of the handle 206 which is conveniently accessible externally of the chamber 14.

In order to apply a controlled degree of heat to the interior 36 of the body chamber 14, as when incubation is needed or desired, there is provided a heating element 220 which is positioned in juxtaposition to the exterior surface of the bottom wall 28 of said body chamber (Figs. 2 and 3). The heating element 220 extends over substantially the entire surface area of the wall 28 and is of a configuration conforming to the contour of said bottom wall. Thus the heating element 220 extends substantially for the full length of the bottom wall 28 and is of arcuate cross section substantially corresponding to the cross sectional contour of said bottom wall. Disposed in juxtaposition to the outside face of the heating element 220 is a sheet of insulation material 222 which is retained in position by means of the retainer wall 224, it being noted that said heating element is positioned between the bottom wall 28 and the insulation sheet 222 and that the retainer wall 224 supports said heating element and said insulation sheet in place. The wires 226, which are electrically connected to the heating element 220, are connected in series with the thermostatic switch 228 projecting into the interior 36 of chamber 14 from the end wall 32 thereof and the switch 230 which is mounted on the instrument panel 232. Thus the switch 230 controls the operation of the heating element 220 and the thermostatic switch 228 is connected in series with said switch for controlling the temperature of the interior 36 of the body chamber 14.

The body chamber 14 is adapted for fluid communication with the pumping apparatus 18 and when said apparatus is operatively associated with said chamber the former is adapted to periodically supply air to and withdraw air from said chamber to simulate normal respiration, said apparatus alternating between partial evacuation and normal pressure of the air within said chamber at a controlled and variable rate to successively simulate normal respiration. With reference to Figs. 8–11, the pumping apparatus 18 comprises a cylinder 234 having a cylinder head 236, there being provided a piston 238 reciprocable in said cylinder. Secured in the cylinder 234 in any suitable manner as by means of the brackets 235 and 274 is a piston guide rod 240 which extends through the aperture 242 of the piston guide shaft 244, it being understood that said piston guide shaft is slidably mounted on the guide rod 240. The piston 238 is provided with the usual piston ring 239 for the sealing the pumping chamber 248 defined between said piston and cylinder head 236 during the reciprocation of the piston. Secured to the piston guide shaft 244 in any suitable manner, as by means of the fastener device 250, is a piston guide rod 252 which has its lower end secured to the crank arm 254 rotatably mounted on the output shaft 256 of the speed reducer 258 which is secured to the base plate 260 in any suitable manner. The input shaft 262 of the speed reducer 258 has a pulley 264 positioned thereon, said pulley being of the conventional split type and being adapted for driving association with the drive shaft 266 of the electric motor 268 which is mounted on the base plate 260. Thus the pulley 270, mounted on the shaft 266, is adapted for driving engagement with the pulley 264 by means of the drive belt 272. From the above it will be apparent that the electric motor 268 is adapted to drive the input shaft 262 of the speed reducer 258, the output shaft 256 of said speed reducer being operatively connected to the piston rod 252 to thereby reciprocate said rod and the piston 238, in the cylinder. The cylinder head 236 is mounted in the interior of the base part 12 by means of the upright members 276 which are suitably connected at one end to the base plate 260 and at their opposite ends to said cylinder head. The shaft 262 has a worm gear 278 mounted thereon, said worm gear being rotatably supported above the base plate 260 through the intermediation of the brackets 280 which are suitably secured to said base plate. The outer end 284 of the shaft 262 extends through the front wall 286 of the base part 12 and has a suitable knob 288 secured thereto, the rotation of said knob being effective to correspondingly control the adjustment of the split pulley 264 whereby to vary the speed of reciprocation of the piston 238 to thereby control the respiration rate of the pump 18. The worm wheel 282 which is mounted to the base plate 260 in meshing relation with the worm gear 278 has a flexible shaft 290 secured thereto and extending therefrom, said flexible shaft being connected to the indicator 292, which is calibrated in respirations per minute mounted on the instrument panel 232. Thus the rotation of the shaft 262, by means of the knob 288, will be effective to adjust the split pulley 264 and concomitantly the position of the worm gear 278, said adjustment being indicated on the indicator 292 through the intermediation of the flexible shaft 290 and the worm wheel 282 which is in meshing relation with the worm gear 278. Thus the positioning of the knob 288 and the speed of reciprocation of the piston 238 will at all times be indicated on the indicator 292 which, as previously mentioned, is calibrated in respirations per minute.

The cylinder head 236 is provided with a pair of spaced ports 294 and 296, said port 294 communicating with the passage 298 defined by the valve body 300. Extending between the valve body 300 and the fitting 302, extending through the bottom wall 28, is a conduit 304 which is secured to said valve body and fitting in fluid sealing relation therewith, said conduit defining the passage 306 which is adapted for fluid communication with the passage 298 when the pumping chamber 248 is operatively associated with the body chamber 14. When the pumping chamber 248 is in fluid communication with the interior 36 of the chamber 14, the reciprocation of the piston 238 will be effective to rhythmically vary the air pressure in said chamber to simulate normal respiration, it being understood that the down stroke of the piston 238 is the negative pressure stroke which partially evacuates said chamber and that the upstroke of said piston is the positive pressure stroke which supplies air to said chamber. In the normal operation of the instant apparatus, the pumping chamber 248 will be in fluid communication with the chamber 14 when the cover 26 is closed and the positive pressure supplied by the pump 18 is under the control of the positive pressure control valve 305 which is suitably integrated with the port 308 provided in the cylinder head 236. The venting of the port 308 is under the control of the valve member 310, the latter having a stem 312 which is supported for axial movement by means of the bracket 314 mounted on the cylinder head 236. The compression spring 316 is disposed between the bracket 314 and the valve member 310 and is adapted to lightly bias said valve member in the valve closed position illustrated in Fig. 11. When negative pressure is created in the pumping chamber 248 atmospheric pressure will be effective to close the valve member 310 and the creation of positive pressure in said chamber will tend to move the valve member 310 in an opening direction, the degree of opening being under the control of the adjustable stop device 318 which is rotatably mounted on the brackets 320 for operative association with the valve stem 312. The brackets 320 are suitably secured to the cylinder head 236 and the adjustable stop device 318 is rotatably carried in said brackets and is adapted to control the degree of venting of the port 308 when positive pressure is created in the pumping chamber 248. The eccentric stop device 318 may be rotated to a position to completely close the valve member 310 and may be adjusted to provide any desired degree of opening of the port 308 to controllably vent the latter during the positive pressure phase of the pumping cycle. The stop device 318, which is in the form of an eccentric member, has a flexible shaft 321 secured thereto, said flexible shaft being operatively connected to the knob 322 mounted on the instrument panel 232. Thus the manual manipulation of the positive pressure control knob 322 will be effective to correspondingly rotate the stop device 318 to thereby control the degree of opening movement of the valve member 310 during the positive pressure phase of the pumping cycle.

In order to control the amount of negative pressure created by the pump there is provided a negative pressure control valve 324 which controls the venting of the port 326 defined in the cylinder head 236. The negative pressure control valve 324 includes a housing 328 which is positioned in fluid communication with the port 326, said housing having a port 330 which communicates with the atmosphere with the latter port being controlled by the valve member 332. The valve member 332 is provided with a stem 334 which is supported and guided for axial movement in relation to the port 330 by means of the bracket 336, there being provided a compression spring 338 between said valve member and the bracket 336. The spring 338 is a relatively light spring in order to just overcome the weight of the valve member 332, and the opening of the port 330 to fluid communication with port 326 is controlled by the valve member 332 which is in turn controlled by the adjustable stop device 340 which is cooperatively associated with the valve stem 334 in the manner previously described in connection with the stop device 318. Thus the venting of the port 330 to the pumping chamber 248 controls the amount of negative pressure created by the pumping apparatus and it will be apparent that the greater the amount of venting of said port the lower will be the amount of negative pressure created by said pumping apparatus. The stop device 340 is structurally similar to the stop device 318 aforedescribed and is controlled by means of the flexible shaft 342 which is operatively connected to the negative pressure control knob 344 mounted on the instrument panel 232. Thus the manipulation or manual rotation of the knob 344 controls the position of the eccentric stop device 340 whereby to control the venting of the port 330 to the pump to thereby control the amount of negative pressure created by the pump.

In order to limit the amount of negative pressure of vacuum created by the pumping apparatus there is provided a relief valve 346 which is integrated with the piston 238 in such a manner as to vent the pumping chamber 248 to atmosphere in the event of the creation of excess negative pressure therein. Thus in the event of excess negative pressure or vacuum created by the pumping apparatus 18 the valve 346 will open to vent the pumping chamber 248 to atmosphere. Since the relief valve 346 forms no part of the present invention it is deemed that a detailed description thereof is unnecessary.

In order to limit the amount of positive pressure created by the pumping apparatus 18, there is provided a positive pressure relief valve 348 which is integrated with the cylinder head 236 in such a manner as to vent its associated port to the atmosphere in the event of the creation of excess positive pressure in the chamber 248. The positive pressure relief valve 348 forms no part of the present invention and accordingly a detailed description thereof is considered unnecessary.

When the pump 18 is in operation and the body chamber cover 26 is in the open position, said pump is adapted to periodically supply air to, or rhythmically vary the air pressure in, the interior of the head chamber 16 through the port 296 provided in the cylinder head 236. Mounted on the cylinder head 236, in fluid flow relation with the port 296, is a valve housing 350 which is provided with a laterally projecting tubular fitting 352 which is adapted for fluid communication with the head chamber 16 by means of the conduit 354, one end of said conduit being secured to the fitting 352 with the opposite end of said conduit being suitably interconnected with the wall 30 in fluid flow relation with the interior of the head chamber 16. Thus when the port 296 is open fluid communication is established between the chamber 248 and the interior of the head chamber. Extending into the valve housing 350 is a tubular part 358 which has its upper end 360 open to atmosphere. Operatively associated with the port 296 is a valve member 362 which is lightly biased in a closing direction by means of the spring 364, said spring being disposed between the retainer part 366 and said valve member. The valve member 362 is provided with a valve stem 368, the position of which is under the control of mechanism to be described hereinafter. When the valve member 362 is positioned to close the port 296 the interior of the head chamber is vented to the atmosphere through the opening 360, it being noted that the lower end 361 of the part 358 is spaced from the cylinder head 236 and defines the passage 370 which provides fluid communication between the interior of the head chamber and the atmosphere. Thus when the valve member 362 is in its closed position the interior of the head chamber will be vented to the atmosphere through the passage 372 defined by the conduit 354 and the passage 370 which communicates with the opening 360 defined by the tubular part 358. When the valve stem 368 is released for opening movement of the valve member 362, the opening of the latter will close the passage 370 leading to the atmosphere due to the engagement of said valve member with the lower end of the tubular part 358. When the valve stem 368 is released for axial upward movement, the valve member 362 will be in closed position during the negative pressure or vaccum phase of the pumping cycle with the head chamber being vented to the atmosphere in the manner aforedescribed and during the positive pressure phase of the pumping cycle the interior of the head chamber will be in fluid communication with the chamber 248 with the valve member 362 being seated on the lower end of the tubular part 358 to thereby close the passage 370 leading to the atmosphere.

Pursuant to the present invention, the pumping chamber 248 is adapted to be in fluid communication with the interior 36 of the body chamber 14 when the body chamber cover 26 is in the closed position and said pumping chamber is adapted to be in fluid communication with the interior of the head chamber 16 when the cover 26 is in the open position. The opening of the cover 26 is effective to shut off the fluid communication between the body chamber 14 and the pump and the closing of said cover is effective to shut off the supply of air from the pump to the head chamber. The valve stem 368 is mounted for axial movement by means of the bracket 374 fixed to the housing 350 and operatively associated with said valve stem for controlling the movement of the latter is a stop member 376 fixedly secured to the rotatable shaft 378. The stop member 376 is movable between the solid line position shown in Fig. 10 in which the valve member 362 is free for opening movement and the broken line position shown in said figure in which said valve member is restrained against opening movement to maintain the port 296 closed, the rotation of the shaft 378 controlling the position of said stop member. The shaft 378 is mounted for rotation in the pair of spaced brackets 380 which are suitably secured to the cylinder head 236 and secured to said shaft through the intermediation of the fitting 382 is a flexible shaft 384 having one end 385 secured to said fitting and having its opposite end 387 secured to the bracket 389 which is suitably fixed to the movable plate 80 of hinge 74. As shown in Fig. 19, there is provided a suitable opening 386 in the wall 56 for the extension therethrough of the flexible shaft 384.

Thus, the position of the stop member 376 is under the control of the openable cover 26 and when said cover is in a closed position the stop member 376 is in the broken line position shown in Fig. 10 in which the pumping chamber 248 is out of fluid communication with the head chamber with the latter being vented to the atmosphere in the manner aforedescribed. Similarly, when the cover 26 is pivoted to the opened position the flexible shaft 348 will be effective to rotate the stop member 376 to the solid line position shown in Fig. 10 in which the valve member 362 is free for opening movement to permit the head chamber to be in fluid communication with the pumping chamber 248 during the positive pressure phase of the pumping cycle. Secured to the shaft 378, in any suitable manner, is a crank arm 390 which is pivotally interconnected with a lever arm 392 at 393, said arm 392 in turn being pivotally interconnected with the arm 394 at 400, the latter arm being fixed to the valve shaft 396. The shaft 396 carries the valve member 398 which controls the fluid flow through the valve body 300 and consequently the fluid communication between the pumping chamber 248 and the body chamber 14. When the valve member 398 is in the broken line position shown in Fig. 2 the pumping chamber and the body chamber are in fluid communication and when said valve member is in the position shown in Fig. 10 in which fluid flow through the valve body 300 is shut off, said pumping chamber and said body chamber are out of fluid communication. When the valve member 398 is closed as shown in Fig. 10 to shut off fluid communication between the pumping chamber 248 and the body chamber, the stop member 376 is disposed in the solid line position shown in said figure to thereby permit fluid communication between said pumping chamber and the head chamber during the positive pressure phase of the pumping cycle. Similarly, when the valve member 398 is open to provide fluid communication between the pumping chamber and the body chamber, the stop member 376 is disposed to retain the valve 362 in the closed position to thereby prevent fluid flow from the pumping chamber to the head chamber. Thus, the control of the fluid flow from the pumping chamber 248 to the head and body chambers is under the control of the cover 26 through the intermediation of the flexible shaft 384 so that when said cover is in the closed position fluid flow is provided between the pumping chamber 248 and the body chamber with fluid flow from said pumping chamber to the head chamber being shut off and when said cover is in the open position fluid flow to the head chamber during the positive pressure phase of the pumping cycle is provided and fluid flow to the body chamber from the pump is shut off. Extending between the shaft 400 and the fitting 401 on the cylinder head 236 is a tension spring 402 which is adapted to provide an overcentering arrangement for biasing the valve member 398 in both the open and closed positions and to provide a quick valve opening and closing arrangement. Thus, the spring 402 is adapted to overcenter in relation to the valve shaft 396 in both the valve opening and closing directions to thereby provide an arrangement for quick opening and closing the valve member 398 and to spring bias the latter in either its opened or closed position. From the above it will be apparent that when the cover 26 is pivoted to the open position positive pressure will cyclically be applied to the interior of the head chamber 16 so that when said cover is opened to treat the patient's body, the application of artificial respiration will continue automatically without interruption. It will be understood that the amount of positive pressure cyclically applied to the interior of the head chamber will be under the control of the positive pressure control knob 322 disposed on the instrument panel.

The gauge 404 is a positive pressure gauge which is in fluid communication with the body chamber 14 and the gauge 406 is a negative pressure or vacuum gauge which is similarly in fluid communication with said body chamber, it being noted that said gauges are mounted in adjacent relation on the instrument panel 232. Similarly, the gauges 408 and 410 are negative pressure and positive pressure gauges, respectively, which are in fluid communication with the interior of the head chamber. The power switch 412 is suitably mounted on the instrument panel 232 and controls the flow of current to the motor 268 which drives the pumping apparatus 18.

Figure 8:
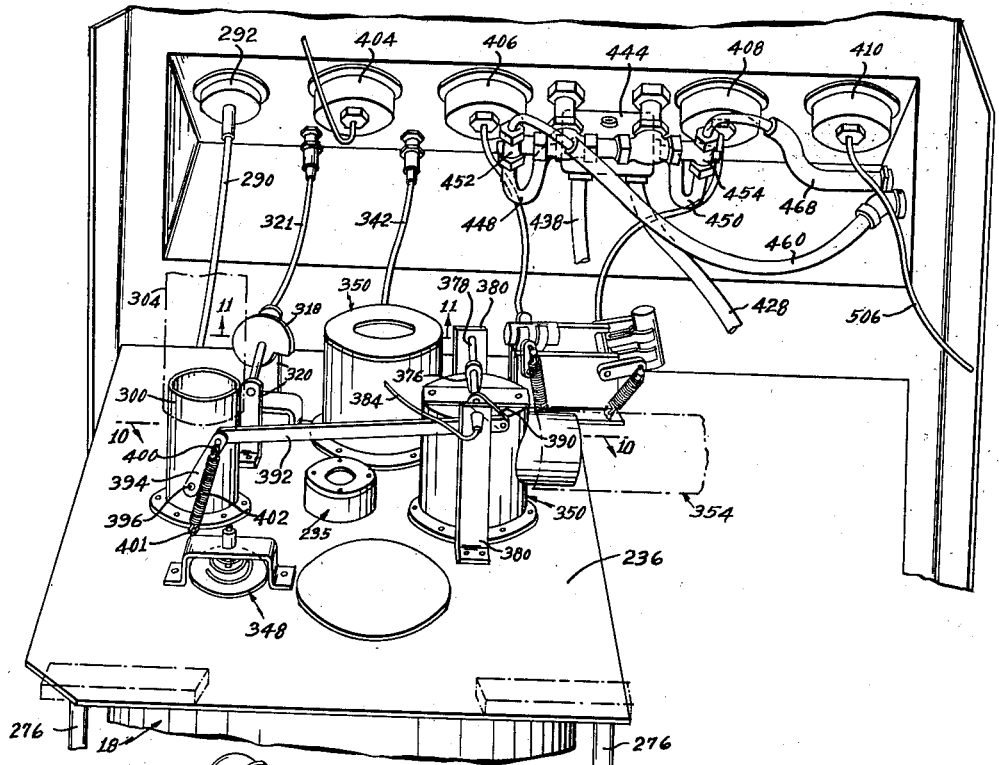
Fig. 8 is a perspective view of the rear of the instrument panel and the upper part of the pumping apparatus.
Figure 9:
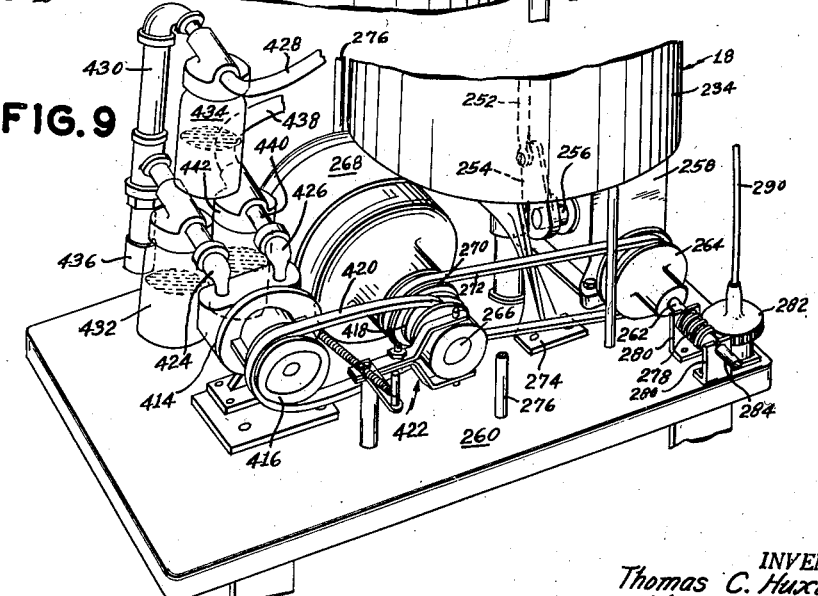
Fig. 9 is a perspective view showing the lower part of the pumping apparatus and associated drive mechanism.
Figure 13:
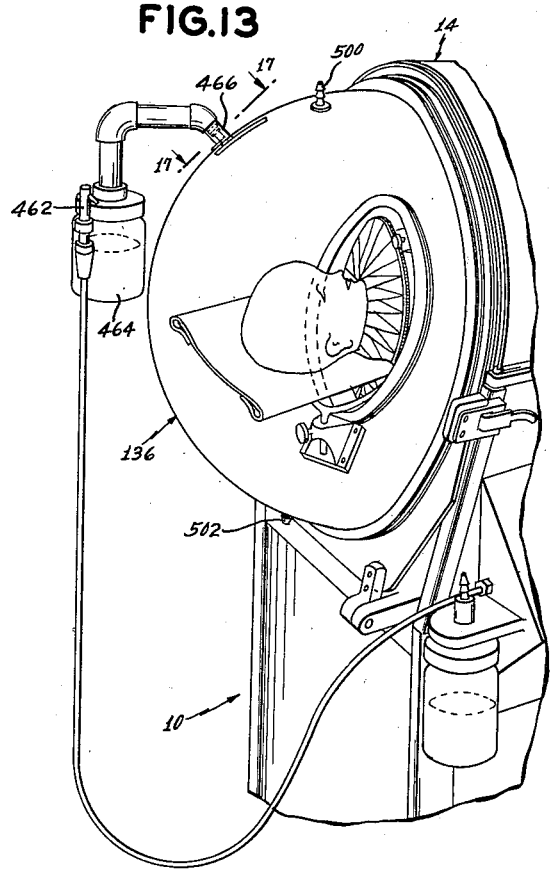
Fig. 13 is a perspective view of the head end of the respiration apparatus showing an atomizer bottle operatively connected to the head chamber.
Figure 14:
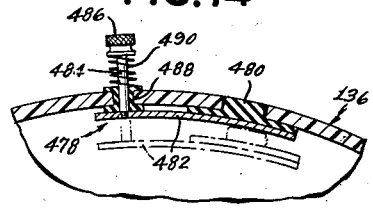
Fig. 14 is a sectional view, on an enlarged scale, taken on the line 14—14 of Fig. 1.
Figure 15:
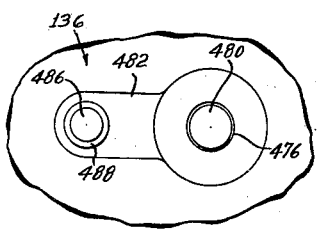
Fig. 15 is a plan view of the fragmentary portion of the apparatus shown in Fig. 14.
Figure 16:
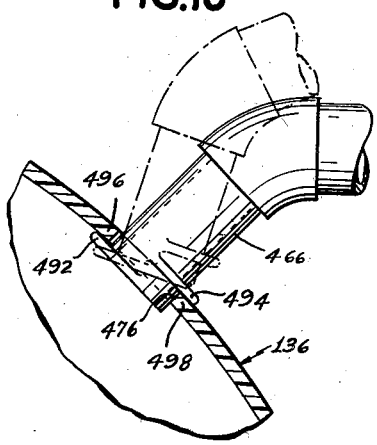
Fig. 16 is a fragmentary view illustrating the manner of interconnecting the outlet fitting of the atomizer bottle with the head chamber.
Figure 17:
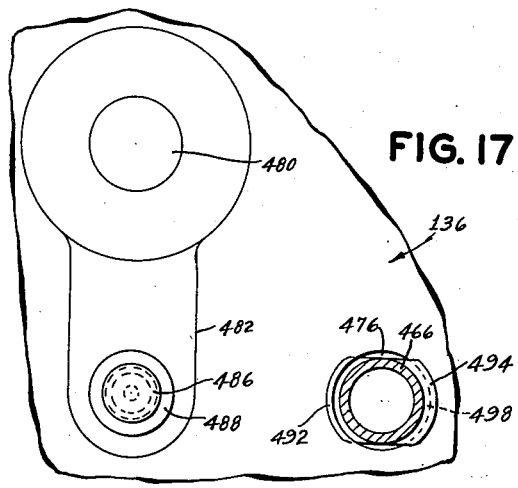
Fig. 17 is a partial sectional view taken on the line 17—17 of Fig. 13, on an enlarged scale.

Suitably mounted on the base plate 260 (Fig. 9) is a rotary pump 414 which is adapted to be driven by the motor 268, said pump having a pulley 416 which is adapted for driving association with the motor pulley 418 through the belt 420 when the clutch 422 is engaged for drivingly interconnecting the motor to the pump. Thus the rotary pump 414 is adapted for operation through the clutch 422 and when said clutch is engaged the rotary pump will be operated by the pump motor 268. It will be understood that the rotary pump 414 may be driven from any suitable power source in any suitable manner and the arrangement illustrated and described herein is given by way of example only. The rotary pump 414 is provided with vacuum and pressure outlet fittings 424 and 426, respectively, and said vacuum outlet fitting is adapted for connection to the conduit 428 through the vacuum line 430, there being interposed in said vacuum line a muffler bottle 432 and a float valve bottle 434 of any conventional construction, said float valve bottle being adapted to shut off the fluid flow through the line 430 when the liquid in said bottle reaches a predetermined level. Suitably interposed in the vacuum line 430 is a vacuum relief valve 436 of any conventional construction. The pressure conduit 438 is in fluid communication with the pressure outlet fitting 426 through the pressure line 440, there being interposed in said line a muffler bottle 442. The conduits 428 and 438 are connected in fluid flow relation to the selector valve 444 which is schematically shown in Fig. 8, said selector valve being controlled by the two position control knob 446 mounted on the instrument panel 232. The conduit 448 is adapted for fluid communication with the conduit 438 in one position of the selector valve knob 446, said one position corresponding to the atomizer position of said knob. Similarly, the conduit 450 is adapted for fluid communication with the conduit 428 in the other position of the knob 446, said other position corresponding to the aspirator position of said knob. When the selector valve knob 446 is in the atomizer position the conduits 438 and 448 are in fluid communication with the conduits 428 and 450 are out of fluid communication with the conduit 428 being vented to the atmosphere through the selector valve 444. Similarly when the selector valve is in the aspirator position the conduits 428 and 450 are in fluid communication through the selector valve 444 and the conduits 438 and 448 are out of fluid communication with the conduit 438 being vented to the atmosphere through said selector valve. Thus the selector valve 444 is a two-position selector valve and when fluid flow is provided through said valve to either the vacuum or pressure conduit the other conduit is vented to the atmosphere. Interposed in the conduits 448 and 450 are needle valves 452 and 454, respectively, the needle valve 454 being controlled by the atomizer knob 456 mounted on the instrument panel 232 and the needle valve 454 being controlled by the aspirator control knob 458 mounted on said panel, the knobs 456 and 458 being adapted to control the venting of their associated valves to the atmosphere to control the fluid flow through their associated conduits. The conduit 460 is a pressure or atomizer conduit which is adapted for fluid communication with the conduit 448 through the valve 452, said conduit 460 being in fluid communication with the fitting 462 which is adapted to be detachably connected to the atomizer bottle 464. It will be understood that the fitting 462 is formed complementary to a fitting provided on the atomizer bottle or container 464 and when said atomizer bottle is in fluid flow relation with the pressure outlet fitting 426 of the pump 414 there is provided a finely divided spray or mist of the liquid contents of the bottle 464 which is adapted to be applied to the head chamber through the outlet fitting 466 of said bottle. The vacuum conduit 468 is connected in fluid flow relation with the conduit 450 through the valve 454 and said conduit 468 terminates at 470 in the interior of the aspirator bottle 472. The fitting 474 of the aspirator bottle 472 is adapted for the reception of one end of a nasal catheter or similar tube with the opposite end of said catheter or tube being adapted to be disposed in the patient's nose or mouth for relieving the patient of congestion, as will be readily apparent. Thus either the aspirator or the atomizer of the instant apparatus may be selectively operated by means of the selector valve knob 446 positioned on the instrument panel.

With reference to Figs. 13 through 17, the atomizer bottle or container 464 is adapted to be detachably connected to the dome 136 with said container being disposed in a substantially upright position. The dome 136 is provided with an opening 476 which communicates with the interior of the head chamber and said opening is provided with removable closure means 478, the latter comprising a plug 480 formed of any suitable material. The plug 480 is formed complementary to the opening 476 and is carried by the arm 482 which is secured to the shaft 484, the latter having an externally accessible knurled knob 486 for facilitating the manipulation of the plug 480 into and out of engagement with the opening 476. The shaft 484 extends through the bushing 488 provided in the dome 136 and the arm 482 is biased outwardly of said dome by means of the compression spring 490 which surrounds said shaft. The closure means or device 478 is normally in the solid line position shown in Fig. 14 and said device may be readily manipulated to uncover the opening 476 by depressing the knob 486 inwardly to the broken line position shown in Fig. 14 and rotating the knob so as to rotate the plug 480 out of registry with the opening 476 shown in Fig. 17. In order to removably mount the container 464 to the dome 136 for providing fluid communication between said container and the interior of the chamber 16, the outlet fitting 466 of said container terminates in a pair of laterally projecting oppositely positioned peripherally extending portions 492 and 494 which are axially spaced on the outlet fitting corresponding to the thickness of the dome 136. The forwardmost laterally projecting portion 492 is adapted to interengage with the portion 496 of the dome 136 interiorly of head chamber and the rearwardmost laterally projecting portion 494 is adapted to interengage with the portion 498 of said dome exteriorly of said chamber wherein it will be apparent that when the fitting 466 is mounted to the dome 136 the portions 492 and 494 are interengaged with said dome at opposite sides of the opening 476. The fitting 466 may be readily mounted to the dome 136 by manipulating the portion 492 under the peripheral portion 496 of the dome 136 in the manner shown in Fig. 16 and when said portion 492 is disposed in interengaged relation with the peripheral portion 496, the opposite portion 494 will be disposed in engagement with the peripheral portion 498 of the dome 136 exteriorly of the head chamber. The fitting 466 may be readily manipulated out of supporting engagement with the dome 136 by manipulating said fitting upwardly so as to disengage the portion 492 from the dome portion 496.

The dome 136 is provided with a suitable fitting 500 for the admission of oxygen or any other therapeutic agent and said dome is provided with an additional fitting 502 for the purpose of sampling the contents of the head chamber. As will be readily apparent the fittings 500 and 502 are normally capped, it being understood that when the body chamber is in fluid communication with the pump 18 the head chamber will be open to atmosphere. In Fig. 18 there is shown the manner of interconnection of a tube 504 with one of the fittings 500 and 502 which are in fluid communication with the interior of the head chamber. The positive pressure gauge 410 for the head chamber is in fluid communication with said head chamber by means of the conduit 506 which extends into said chamber through the bracket 160.

The instant apparatus is especially suitable for the treatment of infants and for use as a resuscitator for new born infants as in delivery rooms in hospitals. The respiration rate for infants is normally higher than that for adults with the usual range for infants being 30 to 40 cycles per minute although the instant apparatus has a range of 24 to 52 respiration cycles per minute. The aspirator aforedescribed is normally only used when the head chamber dome is in the open position and, as previously pointed out, the aspirator may be connected to the infant's nose or mouth by means of a nasal catheter or any other suitable tube. The atomizer is adapted to provide a finely divided spray or mist in the interior of the head chamber whereby said head chamber may be humidified to a controlled degree. Thus the head chamber may be humidified or if desired aerosol or any other therapeutic agent or oxygen may be applied to the interior of said chamber. Thus the instant apparatus is especially suitable for the resuscitation and treatment of infants and when the body chamber cover is opened to treat the patient's body a rhythmical variation of the air pressure in the head chamber is automatically provided so that the opening of the body chamber cover will not interrupt the application of artificial respiration.

While we have shown and described the preferred embodiments of our invention, it will be understood that various changes may be made in the idea or principles of the invention within the scope of the appended claims.

Having thus described our invention, what we claim and desire to secure by Letters Patent is:

1. Artificial respiration apparatus, comprising means forming a body chamber, means forming a head chamber, a wall between said chambers having an opening for the patient's neck, and means associated with said opening to provide a fluid seal around the neck of the patient to substantially prevent the flow of air into and out of the body chamber through said opening, said chambers being relatively immovable, means selectively operable for rhythmically varying the air pressure alternatively either in said body chamber or in said head chamber, an openable cover for said body chamber to provide access to the patient's body, and means automatically operable in response to the opening of said cover to place said air-pressure varying means into operation for varying the air pressure in said head chamber.

2. Artificial respiration apparatus, comprising means forming a body chamber, means forming a head chamber; a wall between said chambers having an opening for the patient's neck, and means associated with said opening to provide a fluid seal around the neck of the patient to substantially prevent the flow of air into and out of the body chamber through said opening, said chambers being relatively immovable, means providing access to the patient's body and head in said chambers, respectively, and pump means selectively operable for rhythmically varying the air pressure alternatively either in said body chamber or in said head chamber, first valve means controlling communication between said pump means and said body chamber, second valve means controlling communication between said pump means and said head chamber, an openable cover for said body chamber, means interconnecting said first and second valve means, and means operable in response to the movement of said cover to open and closed positions for operating said first and second valve means so as to place the body chamber in communication with said pump means when the cover is closed and to interrupt said communication when said cover is open and concomitantly to place said head chamber intermittently in communication with said pump means when said cover is open and to interrupt communication between said head chamber and said pump means when said cover is closed.

3. Artificial respiration apparatus, comprising means forming a body chamber, means forming a head chamber; a wall between said chambers having an opening for the patient's neck, and means associated with said opening to provide a fluid seal around the neck of the patient to substantially prevent the flow of air into and out of the body chamber through said opening, said chambers being relatively immovable, means providing access to the patient's body and head in said chambers, respectively, and pump means selectively operable for rhythmically varying the air pressure alternatively either in said body chamber or in said head chamber, first valve means controlling communication between said pump means and said body chamber, second valve means controlling communication between said pump means and said head chamber, an openable cover for said body chamber, and means operable in response to the movement of said cover to open and closed positions for operating said first and second valve means so as to place the body chamber in communication with said pump means when the cover is closed and to interrupt said communication when said cover is open and concomitantly to place said head chamber intermittently in communication with said pump means when said cover is open and to interrupt communication between said head chamber and said pump means when said cover is closed.

4. Artificial respiration apparatus, comprising means forming a body chamber, means forming a head chamber; a wall between said chambers having an opening for the patient's neck, and means associated with said opening to provide a fluid seal around the neck of the patient to substantially prevent the flow of air into and out of the body chamber through said opening, said chambers being relatively immovable, means providing access to the patient's body and head in said chambers, respectively, pump means selectively operable for rhythmically varying the air pressure alternatively either in said body chamber or in said head chamber, first valve means controlling communication between said pump means and said body chamber, second valve means controlling communication between said pump means and said head chamber, an openable cover for said body chamber, and means operable in response to the movement of said cover to open and closed positions for operating said first and second valve means so as to place the body chamber in communication with said pump means when the cover is closed and to interrupt said communication when said cover is open and concomitantly to place said head chamber intermittently in communication with said pump means when said cover is open and to interrupt communication between said head means and said pump means when said cover is closed, said second valve means comprising a valve controlled passage connected to said head chamber and normally open to the atmosphere, said valve controlled passage being automatically closed intermittently concomitantly with the intermittent communication of said head chamber with said pump means.

5. Artificial respiration apparatus, comprising a frame having a body chamber and a head chamber, each of said chambers having an openable cover to provide access thereto, one of said covers being hinged on said frame, means for rhythmically varying the air pressure in one of said chambers when its cover is closed, and valve means operable by the opening movement of the cover of said one of said chambers to open position to automatically connect said air pressure varying means to the other of said chambers, said valve means including a plurality of interconnected valves controlling the communication of said air pressure varying means with said chambers respectively, and mechanism including a member disposed at said hinge and operatively connecting said one of the covers to said interconnected valves for moving them to different controlling positions when said one cover is opened and closed, respectively.

6. In artificial respiration apparatus having a body chamber provided with an openable top cover and a separate head chamber, pumping means for rhythmically varying the air pressure in either of said chambers, first conduit means for connecting said pumping means to said body chamber and second conduit means for connecting said pumping means to said head chamber, first valve means for controlling the fluid flow through said first conduit means, second valve means for controlling the fluid flow through said second conduit means, said first and second valve means being operatively interconnected by mechanism including a common operating shaft whereby when one of said valve means is positioned to provide fluid flow through its associated conduit means the other of said valve means is positioned to shut off fluid flow through its associated conduit means, and a flexible shaft connected at one end to said cover and movable therewith, said flexible shaft at the opposite end thereof being connected to said operating shaft for providing fluid communication to said body chamber through said first conduit means when said cover is closed and for providing fluid communication to said head chamber through said second conduit means when said cover is open.

7. In artificial respiration apparatus having a body chamber, a body support positioned in said body chamber, said body support comprising a flexible member, and flexible member support means disposed at opposite sides thereof, said support means comprising a pair of laterally spaced longitudinally extending members, one of said members being fixed and the other of said members being rotatable for adjusting the width of said flexible member for correspondingly raising and lowering a patient supported thereon, and manual means for rotating said other member.

8. In artificial respiration apparatus having a body chamber, a body support positioned in said body chamber, said body support comprising a flexible support member and flexible member support means, said support means being secured to opposite side marginal portions of said flexible member and comprising a pair of laterally spaced support members, one of said support members being rotatable in said body chamber for winding said flexible member thereon and unwinding said flexible member therefrom for adjusting the width of said flexible member for correspondingly raising and lowering a patient supported thereon, means for rotating said one member, and means for releasably retaining said one member in adjusted position.

9. In artificial respiration apparatus having a head chamber provided with an opening communicating with the interior of said chamber, a fluid container adapted to be removably mounted in relation to said opening for providing fluid communication between said container and the interior of said chamber, said fluid container having an outlet fitting formed complementary to said opening, said head chamber having a wall with the latter having said opening defined therein, said outlet fitting terminating in a pair of laterally projecting oppositely positioned peripherally extending portions axially spaced on said fitting corresponding to the thickness of said wall, said pair of portions being adapted to interengage with said wall at opposite sides of said opening with one of said portions disposed interiorly of said chamber and the other one of said portions disposed exteriorly of said chamber for removably mounting said fluid container to said head chamber in fluid communication therewith.

10. Artificial respiration apparatus, comprising means forming a chamber for the patient's body and means forming a separate chamber for the patient's head, a wall between said chambers having an opening for the patient's neck, said body chamber forming means having a top cover movable relative to said wall from a position in which it overlies and covers the patient's body and in which said body chamber is closed to a position in which said body chamber is open to provide access to the patient's body, means for rhythmically varying the air pressure in either of said chambers, and means operable automatically in response to the movement of said top cover to open position to connect said air pressure varying means to said head chamber whereby to maintain the said respirator in operation notwithstanding the opening of said body chamber for access to the patient.

11. Artificial respiration apparatus, comprising means forming a chamber for the patient's body and means forming a separate chamber for the patient's head, a wall between said chambers having an opening for the patient's neck, said body chamber forming means having a top cover movable relative to said wall from a position in which it overlies and covers the patient's body and in which said body chamber is closed to a position in which said body chamber is open to provide access to the patient's body, means for rhythmically varying the air pressure in either of said chambers, and means operable automatically in response to the movement of said top cover to open position to connect said air pressure varying means to said head chamber whereby to maintain the said respirator in operation notwithstanding the opening of said body chamber for access to the patient, said head chamber being closed and continuously vented to atmospheric pressure when said body chamber is closed, and means operable when said cover of the body chamber is open to rhythmically vent said head chamber to atmospheric pressure.

12. In artificial respiration apparatus having a body chamber provided with an openable top cover and a separate head chamber, pumping means for rhythmically varying the air pressure in either of said chambers, first conduit means for connecting said pumping means to said body chamber and second conduit means for connecting said pumping means to said head chamber, first valve means for controlling the fluid flow through said first conduit means, second valve means for controlling the fluid flow through said second conduit means, said first and second valve means being operatively interconnected whereby when one of said valve means is positioned to provide fluid flow through its associated conduit means, the other of said valve means is positioned to shut off fluid flow through its associated conduit means, and means operatively connected to said first and second valve means and operable by said cover for providing fluid communication to said body chamber through said first conduit means when said cover is closed and for providing fluid communication to said head chamber through said second conduit means when said cover is open, said means operatively connected to said first and second valve means comprising a flexible shaft connected to said cover and operable thereby on the movement thereof.

13. Artificial respiration apparatus, comprising a frame having a body chamber and a head chamber, each of said chambers having an openable cover to provide access thereto, one of said covers being hinged on said frame, means for rhythmically varying the air pressure in one of said chambers when its cover is closed, and valve means operable by the opening movement of the cover of said one of said chambers to open position to automatically connect said air pressure varying means to the other of said chambers, said valve means including a plurality of interconnected valves controlling the communication of said air pressure varying means with said chambers respectively, and mechanism including a flexible shaft operatively connecting said one of the covers at said hinge to said interconnected valves for moving them to different controlling positions when said one cover is opened and closed, respectively.

References Cited in the file of this patent

UNITED STATES PATENTS

| | | |
|---|---|---|
| 1,906,453 | Drinker | May 2, 1933 |
| 2,427,665 | Emerson | Sept. 23, 1947 |
| 2,543,426 | Terhaar | Feb. 27, 1951 |
| 2,600,240 | Grieb | June 10, 1952 |
| 2,700,384 | Ivory | Jan. 25, 1955 |